United States Patent
Corbe et al.

(10) Patent No.: US 10,641,638 B2
(45) Date of Patent: May 5, 2020

(54) METHOD FOR FILL LEVEL MEASUREMENT AND A FILL LEVEL MEASURING DEVICE

(71) Applicant: VEGA GRIESHABER KG, Wolfach (DE)

(72) Inventors: Bernard Corbe, Schutterwald (DE);
Michael Fischer, Alpirsbach (DE);
Manuel Kaufman, Gengenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 291 days.

(21) Appl. No.: 15/189,345

(22) Filed: Jun. 22, 2016

(65) Prior Publication Data

US 2017/0176236 A1 Jun. 22, 2017

(30) Foreign Application Priority Data

Jul. 2, 2015 (EP) .................................. 15175162

(51) Int. Cl.
*G01S 7/40* (2006.01)
*G01S 13/08* (2006.01)
*G01S 13/58* (2006.01)
*G01S 13/88* (2006.01)
*G01F 23/284* (2006.01)

(52) U.S. Cl.
CPC .............. *G01F 23/284* (2013.01); *G01S 7/40* (2013.01); *G01S 13/08* (2013.01); *G01S 13/58* (2013.01); *G01S 13/88* (2013.01)

(58) Field of Classification Search
CPC .......... G01F 23/284; G01S 7/40; G01S 13/08; G01S 13/58; G01S 13/88

USPC .......................................................... 342/124
See application file for complete search history.

(56) References Cited

U.S. PATENT DOCUMENTS

| 5,420,591 A | 5/1995 | Gilbert et al. |
| 8,264,373 B2 * | 9/2012 | Hagg ..................... G08C 17/02 340/508 |
| 2012/0299768 A1 * | 11/2012 | Griessbaum ............ G01S 7/292 342/124 |

(Continued)

FOREIGN PATENT DOCUMENTS

| DE | 10 2008 016940 A1 | 10/2009 |
| EP | 2527804 A1 | 11/2012 |
| EP | 2824431 A1 | 1/2015 |

OTHER PUBLICATIONS

European search report for related application 15 175 162.5 dated Jan. 15, 2016.

*Primary Examiner* — Frank J McGue
(74) *Attorney, Agent, or Firm* — William Gray Mitchell

(57) ABSTRACT

Provided are a method for measuring the fill level of a fill substance with at least one radar sensor and with at least one electronic evaluation unit comprising the steps recording of an echo curve, recording of a Doppler frequency spectrum, evaluation of the Doppler frequency spectrum by the electronic evaluation unit and evaluation of the echo curve by the electronic evaluation unit taking into consideration the results of the evaluation of the Doppler frequency spectrum by the electronic evaluation unit, as well as a fill level measuring device with at least one radar sensor and an electronic control and evaluation unit, that is set up for the implementation of such a method.

9 Claims, 5 Drawing Sheets

(56) References Cited

U.S. PATENT DOCUMENTS

| | | | |
|---|---|---|---|
| 2013/0035880 A1* | 2/2013 | Hoferer | G01F 23/28 |
| | | | 702/55 |
| 2013/0110420 A1* | 5/2013 | Griessbaum | G01F 23/28 |
| | | | 702/55 |
| 2015/0007655 A1* | 1/2015 | Skowaisa | G01S 13/34 |
| | | | 73/198 |
| 2015/0369647 A1* | 12/2015 | Kumar | G06Q 30/04 |
| | | | 705/34 |
| 2015/0377680 A1* | 12/2015 | Edvardsson | H01Q 1/225 |
| | | | 73/290 V |

* cited by examiner

METHOD FOR FILL LEVEL MEASUREMENT AND A FILL LEVEL MEASURING DEVICE

CROSS REFERENCE TO RELATED APPLICATIONS

This patent application claims priority to European Patent Application 15 175 162.5, filed on Jul. 2, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a method for fill level measurement and a fill level measuring device.

Background of the Invention

In present day industrial production, where often highly automated processes and minimal warehousing significantly increase cost-efficiency, the monitoring of the fill levels of a fill substance in containers, e.g. liquids or loose materials, has become a standard measure in many application areas. Methods for fill level measurement and/or fill level measuring devices that operate by using radar sensors, with which an echo curve is measured and evaluated, and from which the fill level is derived are particularly popular. It should be noted that the term "radar sensor", as used in this disclosure, is not necessarily limited to a pure detector element that by nature requires a signal output or a communication interface. A radar sensor in the sense of this disclosure can thus also include an active module for emitting the radar signal and/or an electronic control system.

The basic principle of such a measurement is the radiation of a signal into the container and, for example, recording the travel time distribution of the reflected radar echo, from which in particular the distance of the fill substance surface from the radar sensor can be inferred. This is generally carried out automatically by an electronic evaluation unit, which assigns the fill substance surface to a structure in the echo curve according to defined criteria, and calculates a fill level from the position of this structure. The electronic evaluation unit does not necessarily have to be designed as a separate component, but can also be integrated in the radar sensor, in particular its electronic control system.

This approach always has issues, however, if it cannot be ensured that the electronic evaluation unit is indeed identifying the correct structure in the echo curve. These issues are particularly apparent if, as a consequence of the geometry of the container, the radar sensor has to be disposed in such a way that, when filling the container, it cannot be avoided that the fill substance stream enters or crosses the radiation field of the radar sensor's radar beam emitting transmitter. This inevitably leads to the development of an additional structure in the echo curve, which, in particular if it is similar or even more pronounced than the structure of the echo curve produced by the true fill substance surface, is mistakenly identified by the electronic evaluation unit as the fill substance surface and understandably leads to dramatically false fill level information.

To avoid these issues, EP 1 283 412 B1 describes a method for detecting a filling process, in which the echo curve is examined by an electronic evaluation unit to see if it lies within an expected range and, if this is not the case, it is assumed that a filling process is taking place. This, however, only provides the ability to distinguish between meaningful measurement results without a filling process, and not meaningful measurement results during the filling process.

The determination of the flow velocity and the distance to a flowing medium with the aid of the Doppler method is known from EP 2 824 431 A1.

The task of the invention is to provide an improved method for fill level measurement and a fill level measuring device, with which the evaluation of the echo curve can be adapted to the current prevailing conditions—for example a filling process currently in progress, or also emptying, or the operation of a stirrer.

This task is solved by a method for fill level measurement and a fill level measuring device, each with the features as described herein.

BRIEF SUMMARY OF THE INVENTION

In a preferred embodiment, a method for measuring the fill level of a fill substance with at least one radar sensor and with at least one electronic evaluation unit comprising the steps
  Recording of an echo curve,
  Recording of a Doppler frequency spectrum,
  Evaluation of the Doppler frequency spectrum by the electronic evaluation unit, and
  Evaluation of the echo curve by the electronic evaluation unit taking into consideration the results of the evaluation of the Doppler frequency spectrum by the electronic evaluation unit.

In another preferred embodiment, the method as disclosed herein, wherein, in the course of the evaluation of the Doppler frequency spectrum by the electronic evaluation unit, it is determined whether the fill substance surface is moving.

In another preferred embodiment, the method as disclosed herein, wherein, in the course of the evaluation of the Doppler frequency spectrum by the electronic evaluation unit, the speed at which the fill substance surface is moving is determined.

In another preferred embodiment, the method as disclosed herein, wherein, in the course of the evaluation of the Doppler frequency spectrum by the electronic evaluation unit, it is determined whether an inflow or an outflow of the fill substance is occurring.

In another preferred embodiment, the method as disclosed herein, wherein the averaging factors used by the electronic evaluation unit in the evaluation of the echo curve are dynamically adapted in dependence of the results of the evaluation of the Doppler frequency spectrum.

In another preferred embodiment, the method as disclosed herein, wherein, in the evaluation of the echo curve by the electronic evaluation unit, the identification of a structure in the echo curve, which is assigned to the fill level of the fill substance, is affected in dependence of the results of the evaluation of the Doppler frequency spectrum.

In another preferred embodiment, the method as disclosed herein, wherein the echo curve and the Doppler frequency spectrum are recorded at the same time.

In another preferred embodiment, the method as disclosed herein, wherein the echo curve and the Doppler frequency spectrum are recorded with different radar sensors.

In another preferred embodiment, the method as disclosed herein, wherein a flow meter is disposed in an inflow or an outflow, the measured value of which is available to the signal evaluation in the radar sensor as an additional input variable.

In another preferred embodiment, a fill level measuring device with at least one radar sensor and an electronic control and evaluation unit, wherein the electronic control and evaluation unit is set up for the implementation of a method as disclosed herein.

DETAILED DESCRIPTION OF THE INVENTION

Figure 1:
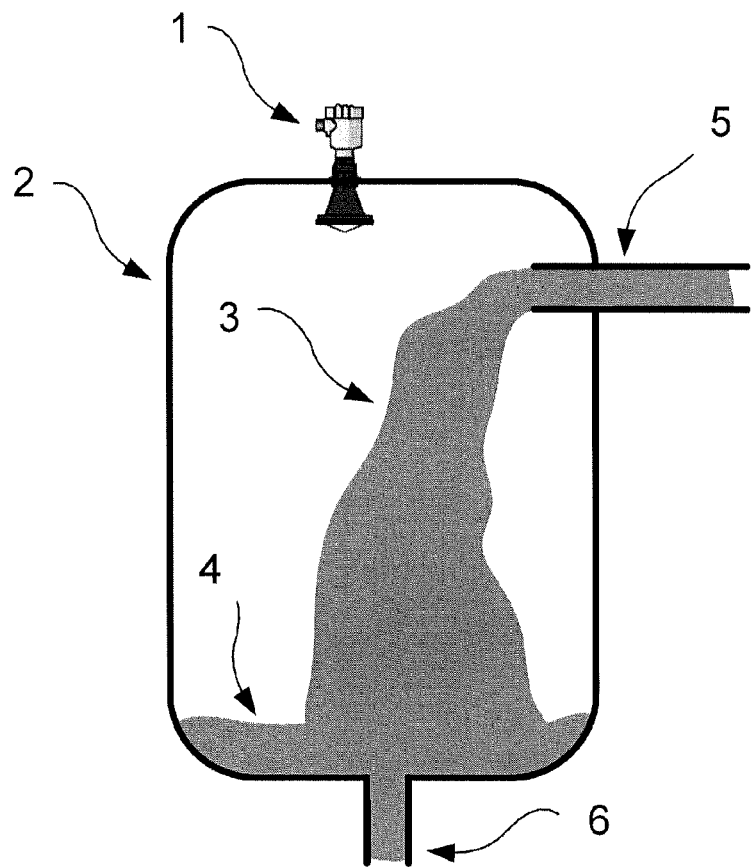
FIG. 1 is a line drawing evidencing a container with a radar sensor, into which fill substance is flowing.

The inventive method for measuring the fill level of a fill substance, which can for example be inside a container, with at least one radar sensor and with at least one electronic evaluation unit at least comprises the steps recording of an echo curve, recording of a Doppler frequency spectrum, evaluation of the Doppler frequency spectrum by the electronic evaluation unit and evaluation of the echo curve by the electronic evaluation unit taking into consideration the results of the evaluation of the Doppler frequency spectrum by the electronic evaluation unit. It is based on the realization of the inventors that detailed information regarding the currently prevailing conditions, with which the evaluation of the echo curve by the electronic evaluation unit can be improved significantly, can be automatically extracted from the Doppler frequency spectrum.

It must be noted that a variety of radar technologies, radar signals and modulation types can be used, for example pulse radar, FMCW radar, pulse-Doppler radar, pulse compression radar, FSK radar and continuous wave radar.

A preferred further development of the method provides that the evaluation of the Doppler frequency spectrum by the electronic evaluation unit determines whether the fill substance surface is changing, for example because a stirring device is active in the container. Since such a change is associated with a movement of the loose material particles or components of liquids, the Doppler frequency spectrum, which contains velocity information, is suitable for identifying such a movement. Particularly if the electronic evaluation unit also has access to information about the fill substance, these movements can be used in the determination of the fill level from the echo curve to account for the effects of a stirrer that is active in the liquid, through the formation of a parabolic surface, for example.

According to another preferred further development of the method, the Doppler frequency spectrum including the therein contained velocity information is used to determine whether an inflow or outflow of fill substance is occurring. This information can be used not only to qualify liquid level information from the echo curve as possibly distorted by the filling process, but also to correct the possible effect on liquid level information from the echo curve or, by means of an estimation of the inflow or outflow rate based thereon, to allow an estimation of the actual liquid level going out from the last undistorted liquid level.

Dynamically adapting the averaging factors used by the electronic evaluation unit in the evaluation of the echo curve in dependence of the results of the evaluation of the Doppler frequency spectrum has proven to be particularly advantageous.

Particularly in cases in which, during filling of the container, a fill stream encroaches on the monitoring range of the radar sensor, i.e. on the radiation field of the antenna of the radar sensor, so that a structure that can be assigned to the fill stream occurs in the echo curve, an indication from the Doppler frequency spectrum that such a fill stream is present can be used to affect the identification of the structure in the echo curve to which the fill level of the fill substance is assigned. Connecting the often active criterion of the structure of the echo curve exhibiting the highest amplitude with the fill level, for example, can lead to false results if a strong fill substance inflow is present in the monitoring range of the radar sensor. By replacing or supplementing this criterion with an additional condition, the structures that pop up erratically in the echo curve can be excluded as possible candidates for the fill level.

It is particularly preferred for the echo curve and the Doppler frequency spectrum to be recorded at the same time, because the two measurements are then carried out by the system under the same conditions. For some of the common radar technologies and modulation types this necessitates the use of different radar sensors for recording the echo curve and the Doppler frequency spectrum. This can also be beneficial, however, even if the use of a single radar sensor would in principle be possible.

It is further preferred if a flow meter is disposed in an inflow or outflow, the measured value of which is available to the signal evaluation in the radar sensor as an additional input variable.

The fill level measuring device according to the invention has at least one radar sensor and at least one electronic control and evaluation unit, which can however also consist of multiple components. It is characterized in that the electronic control and evaluation unit is set up for the implementation of a method according to one of the Claims 1 to 8. This can in particular be ensured by a processor of the electronic control and evaluation unit executing a program stored in a memory that leads to the implementation of the method, i.e. implements the measurement of echo curves and Doppler frequency spectra via the appropriate activation of a radar transmitter belonging to the radar sensor, and analyzes the data measured with the radar detector of the radar sensor as an echo curve or a Doppler frequency spectrum, whereby parameters are obtained from the analysis of the Doppler frequency spectrum that is then used by the electronic evaluation unit in the evaluation of the echo curve.

DETAILED DESCRIPTION OF THE FIGURES

FIG. 1 shows a radar sensor 1, which comprises a not depicted radar transmitter, a radar receiver, as well as an electronic control and evaluation unit. The radar sensor 1 is disposed on a container 2 with a feed pipe 5 and an outlet pipe 6 and, with the aim of deriving a fill level therefrom, is functionally intended to determine the position of a fill substance surface 4. In the depicted situation, a fill substance stream 3 flows through the feed pipe 5 into the container 2 and enters into the monitoring range of the radar sensor 1. Noise echoes which, depending on their position and amplitude, can impair the determination of the position of the fill substance surface 4, occur as a consequence of the presence of the fill substance stream 3. Even in an assembly situation, in which the fill substance stream 3 lies outside the monitoring range of the radar sensor 1 defined by the radiation field of the radar transmitter, an impairment of the position determination can occur, e.g. if the fill substance is a liquid, so that the impact of the fill substance stream 3 onto the fill substance surface 4 causes wave formation.

Figure 2:
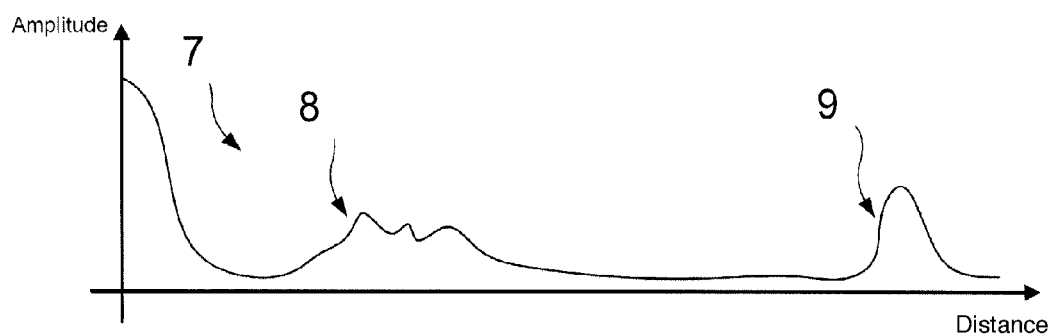
FIG. 2 is a line drawing evidencing a first example for an echo curve, as it could be measured with an arrangement as shown in FIG. 1.
Figure 3:
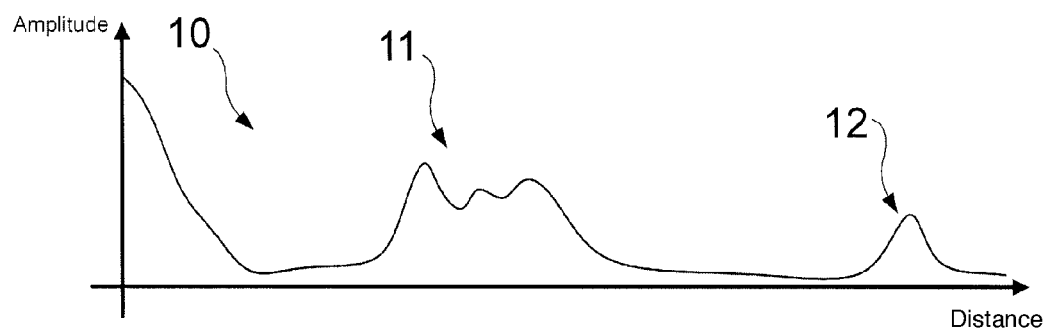
FIG. 3 is a line drawing evidencing a second example for an echo curve, as it could be measured with an arrangement as shown in FIG. 1.

FIG. 2 shows a typical echo curve 7 during a filling process. For the distance measurement, the distributed echoes 8 in the front sector of the curve are caused by the fill stream. The clearly visible individual echo 9 in the rear sector of the curve 7 represents the true fill level echo. In this situation a separation of the fill stream echo and the fill substance echo in the echo curve would still be possible, because the two echoes are far enough apart and the fill substance echo has an adequately large amplitude. Problems arise, however, for an echo curve 10 with a profile similar to that seen in FIG. 3, for example. In this case, the amplitudes of the various noise echoes 11 of the fill stream dominate those of the fill substance echo 12. If the filling process continues, the signal evaluation cannot stay on the true fill substance echo 12 for an extended period of time. Rather, after a certain amount of time the ELECTRONIC EVALUATION UNIT will decide on one of the larger, undesired fill stream echoes 11 and thus provide a false fill level.

If the undesired noise echo of the fill stream and the fill substance echo are close enough to one another, even a relatively small noise echo amplitude can change the curve form, and with it the position of the fill substance echo, and lead to distance errors.

The inventive solution of the described set of problems now aims, with the aid of a Doppler measurement, to detect any dynamic change within the container, and thus provide case-by-case decisions for signal processing concerning the determined distance measurement. The Doppler measurement, or rather the evaluation of the Doppler shift on the received radar signal, provides the velocities with which parts of the contents of the container are moving. In particular a Doppler spectrum, which represents the distribution of the Doppler frequencies measured in the container, and thus also of the velocities, can be calculated from the received radar signal. There is a linear correlation between the Doppler frequency and the velocity.

As shown in particular by FIGS. 6A to 6D, the Doppler frequency spectrum can identify the essential scenarios that are to be differentiated from one another.

Figure 6A:
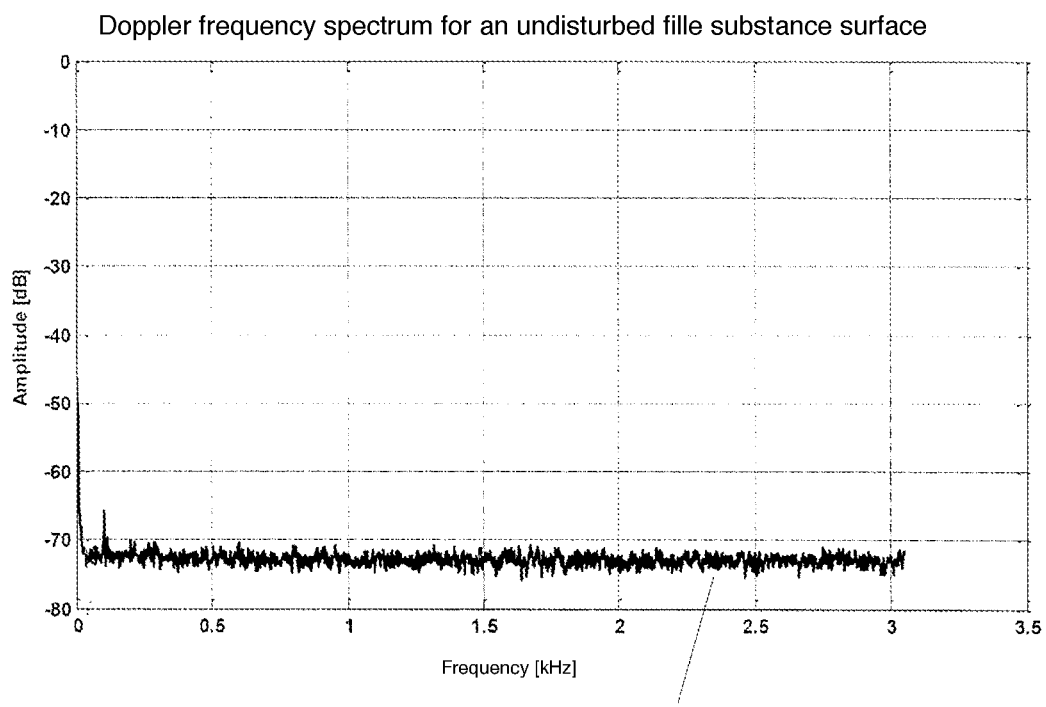
FIG. 6A is a line drawing a Doppler frequency spectrum for an undisturbed fill substance surface.

FIG. 6A shows a Doppler frequency spectrum 18 that originates from an undisturbed fill substance surface 4. The spectrum is without structure and only represents the electronic noise floor of the respective receiver; therefore there is no need at all to change the evaluation of the echo curve in this situation.

Figure 6B:
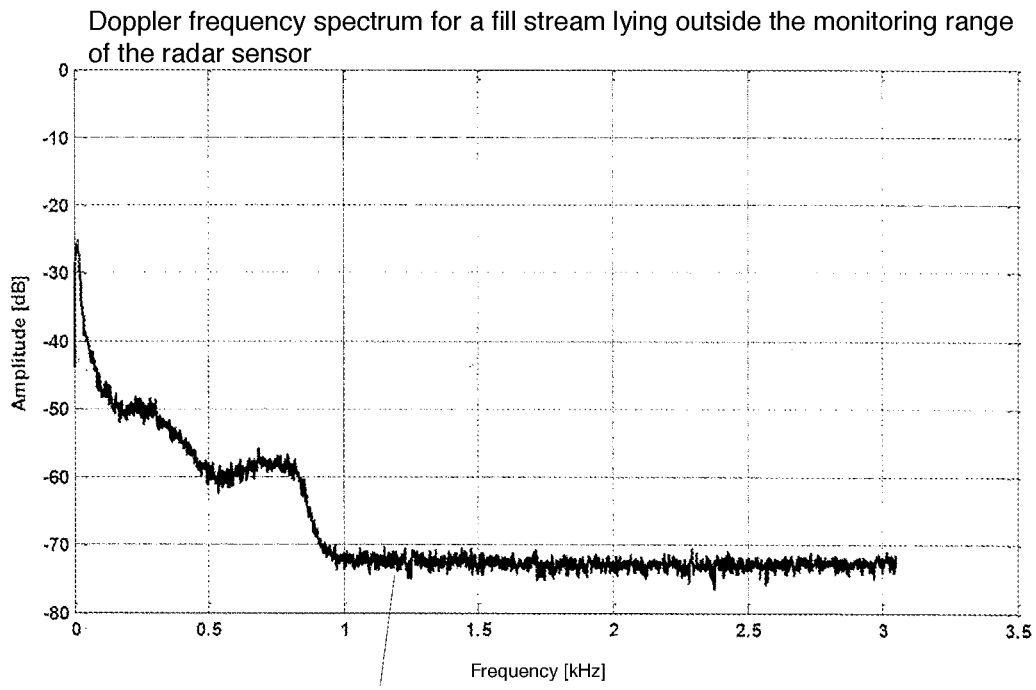
FIG. 6B is a line drawing a Doppler frequency spectrum for a fill stream that does, however, lie outside the monitoring range of the radar sensor.

FIG. 6B shows a Doppler frequency spectrum 19 as obtained if a filling is taking place above the contour line of the fill substance, e.g. through the feed pipe 5 in FIG. 1. Unlike what is shown in FIG. 1, however, the radiated radar signal here is disposed outside the fill stream. Therefore, there are no noise echoes. This is certainly the case, particularly for containers with a large diameter.

Due to the wave formation in the container and the associated more turbulent fill substance surface, a Doppler spectrum will be detected here that is changed in comparison to that of the calm fill substance surface. Thus, in this case as well, the detection of a filling process is possible, which in turn can serve as additional signal processing information for the distance measurement. Obviously, this also applies if stirrers or other components that have a disruptive effect on a smooth fill substance surface are active in the container.

Figure 6C:
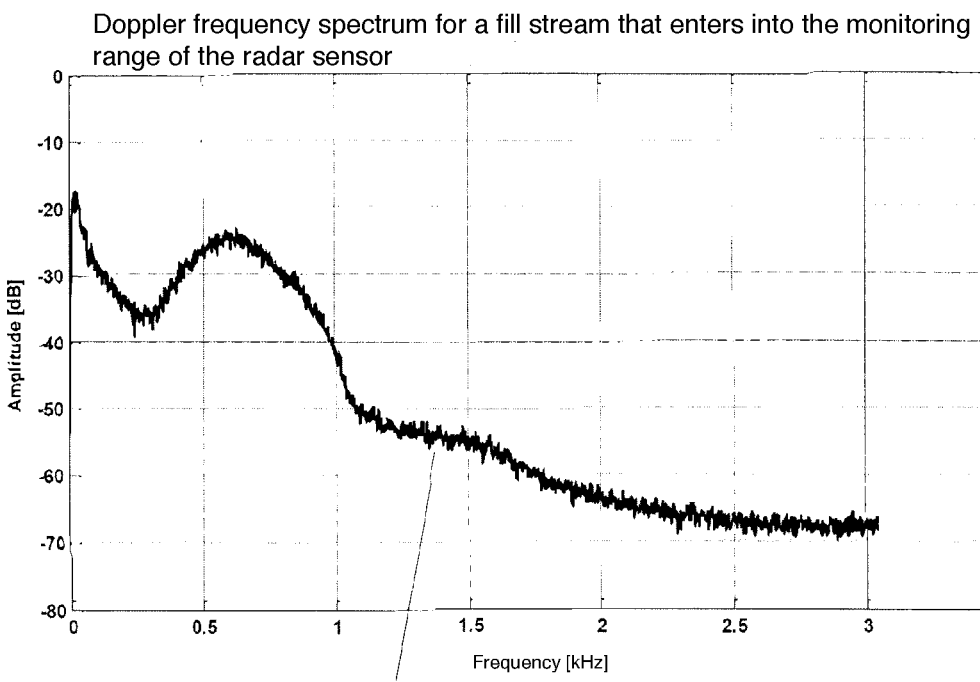
FIG. 6C is a line drawing a Doppler frequency spectrum for a fill stream that enters into the monitoring range of the radar sensor.

FIG. 6C shows a Doppler frequency spectrum 20, as obtained in the situation depicted in FIG. 1, the associated echo curve 7 of which is shown in FIG. 2. In the echo curve there is a simultaneous distance measurement to the fill substance surface and to the fill stream; this situation, however, is reliably identified by the Doppler evaluation. The spectral frequency distribution of the rapidly falling fill substance differs distinctly from the frequency spectrum of the relatively slow fill level change of the contour line. Thus it can be prevented that the echo evaluation decides on the potentially arising larger noise echo 11, as shown in the echo curve 10 in FIG. 3, and provides a false distance value to the fill substance surface.

Figure 6D:
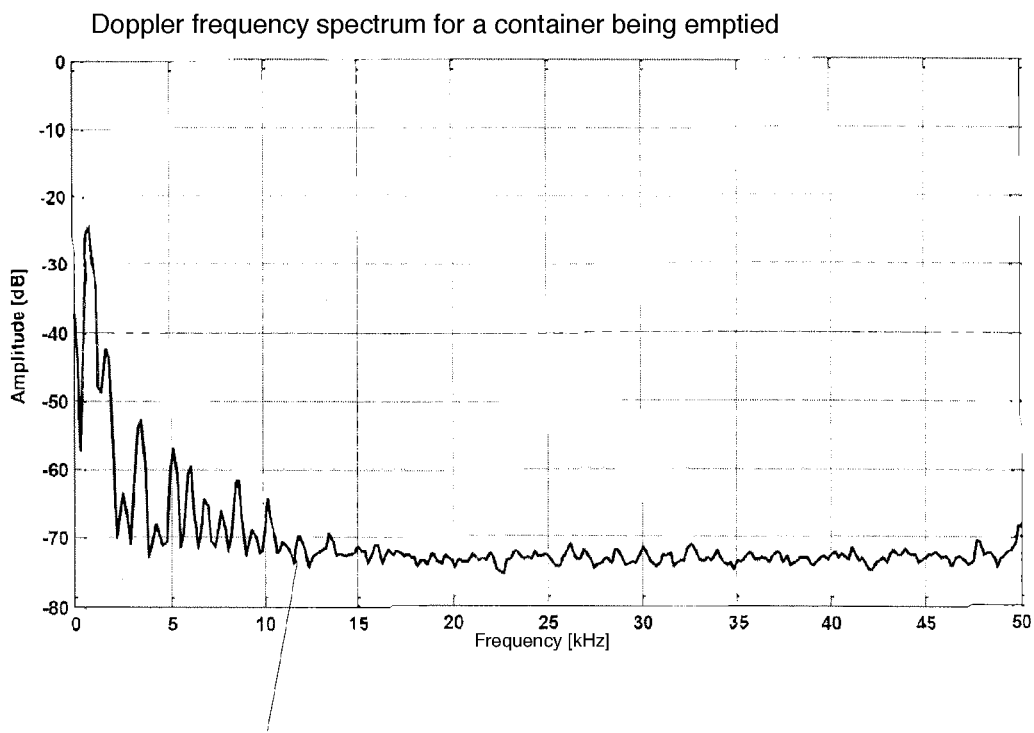
FIG. 6D is a line drawing a Doppler frequency spectrum of a container when it is being emptied.

FIG. 6D shows a Doppler frequency spectrum 21, as obtained when a filling or emptying below the contour line of the fill substance is taking place, for example through the outlet pipe 6 in FIG. 1, so that the radiated radar signal for distance measurement is not disrupted by a fill stream. In this scenario, it is assumed that the fill substance surface remains calm during filling or emptying of the container through the pipe 6, i.e. no significant waves are created on the fill substance surface. Consequently, no additional undesired noise echoes will arise on the echo curve. Here the Doppler measurement provides the velocity with which the contour line of the fill substance is moving as additional information. For rapid changes of the fill level, for example, averaging factors of the distance measurement can thus be dynamically adapted. This furthermore allows the time at which the container will be completely emptied or filled, or when a specific level will have been reached, to be forecast depending on the velocity of the of the fill level change.

A variety of radar technologies, radar signals and modulation types can be used for the fill level measurement and Doppler evaluation of the scenario to be measured. Some commonly used methods for fill level measurement and/or Doppler evaluation are pulse radar, FMCW radar, pulse-Doppler radar, pulse compression radar, FSK radar (FSK=Frequency Shift Keying) and continuous wave radar (also CW radar), for example. This list should not be considered to be complete. Many other radar technologies, in particular also mixed types, can be used in this context.

The listed radar technologies and modulation types allow the fill level measurement and Doppler evaluation to be conducted in a variety of ways. For some modulation types and radar technologies, for example, a simultaneous measurement of distance and velocity or, more specifically, the Doppler shift of the received signal, can be performed. Other modulation types on the other hand, allow only a sequential performance of distance measurement and Doppler evaluation. With pure continuous wave radar, for example, only a Doppler evaluation can be conducted, but not a distance measurement.

Figure 4:
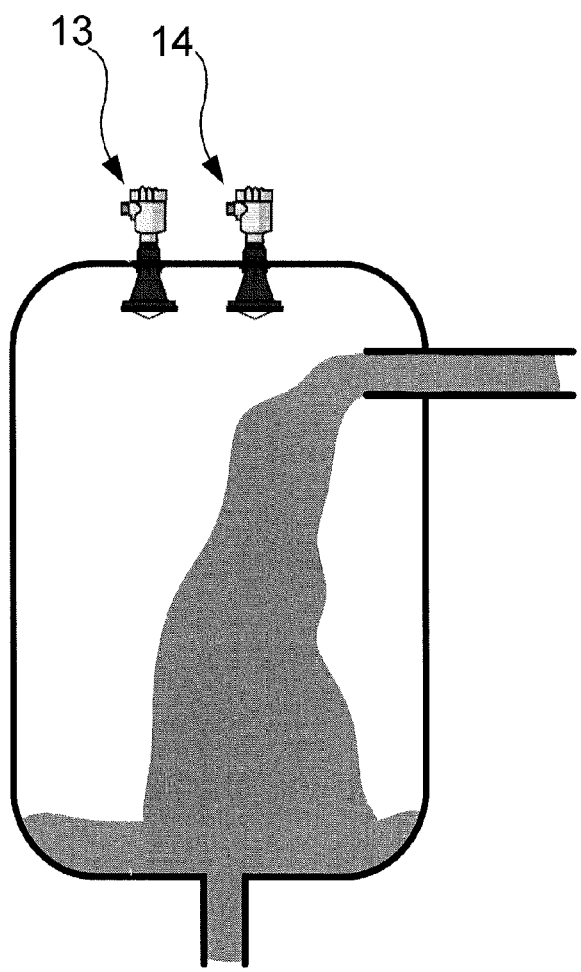
FIG. 4 is a line drawing a container with two radar sensors, into which a fill substance is flowing.

FIG. 4 depicts a scenario in which, for example, the radar sensor 13 is used exclusively for the fill level measurement and radar sensor 14 is used exclusively for the velocity measurement. The measurements are preferably performed at the same time here.

Figure 5:
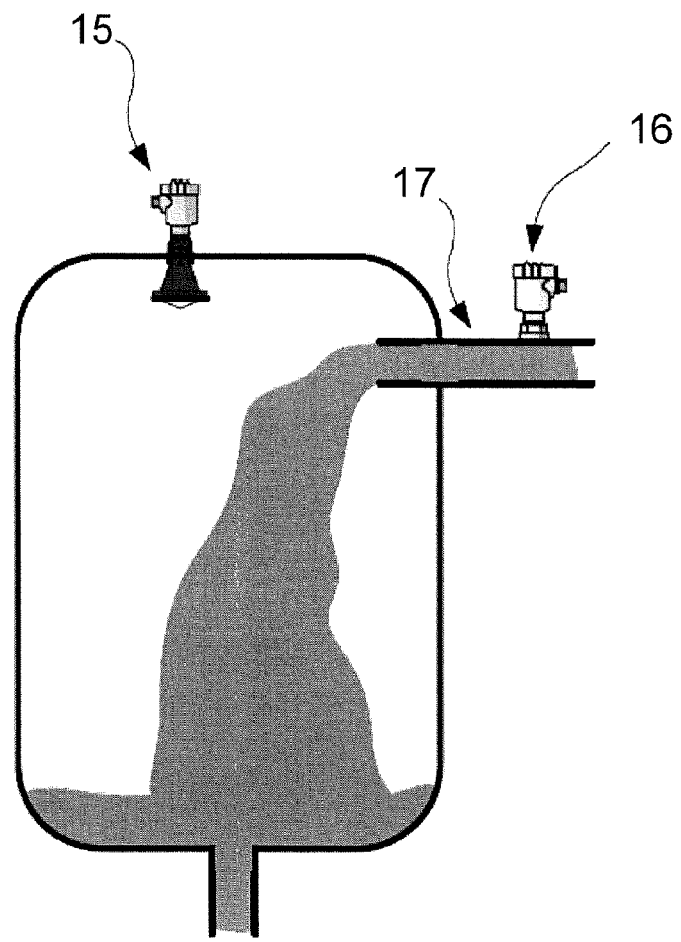
FIG. 5 is a line drawing an alternative configuration of a container with one radar sensor, into which a fill substance is flowing, in which a flow meter is disposed on a feed pipe.

If, due to the spatial proximity to the undesired noise echo of the fill stream, the fill level echo is already being disrupted, the expected distance to the fill substance surface can also be determined via an additional measurement, for example of the flow rate, as indicated in FIG. 5. In this case, there is a flow meter 16 in the feed 17 of the container, the measured flow rate value of which is available to the signal evaluation as an input variable. With the container geometry and the known inflow, the current fill substance level can thus be estimated with the aid of appropriate algorithms, even if no reliable fill level value can be measured during filling by the radar sensor 15.

LIST OF REFERENCE NUMBERS

1 Radar sensor
2 Container
3 Fill substance stream
4 Fill substance surface
5 Feed pipe
6 Outlet pipe
7 Echo curve
8 Noise echo
9 Fill substance echo
10 Echo curve
11 Noise echo
12 Fill substance echo
13 Radar sensor
14 Radar sensor
15 Radar sensor
16 Flow rate sensor
17 Feed
18 Doppler frequency spectrum
19 Doppler frequency spectrum
20 Doppler frequency spectrum
21 Doppler frequency spectrum The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A method for measuring a fill level of a fill substance with at least one radar sensor and with at least one electronic evaluation processor comprising the steps
   Recording of an echo curve,
   Recording of a Doppler frequency spectrum,
   Evaluation of the Doppler frequency spectrum by the electronic evaluation processor, and
   Evaluation of the echo curve by the electronic evaluation processor taking into consideration the results of the evaluation of the Doppler frequency spectrum by the electronic evaluation processor, and wherein averaging factors used by the electronic evaluation processor in the evaluation of the echo curve are dynamically adapted in dependence of the results of the evaluation of the Doppler frequency spectrum.

2. The method according to claim 1, wherein, in the course of the evaluation of the Doppler frequency spectrum by the electronic evaluation processor, it is determined whether a fill substance surface is moving.

3. The method according to claim 2, wherein, in the course of the evaluation of the Doppler frequency spectrum by the electronic evaluation processor, a speed at which the fill substance surface is moving is determined.

4. The method according to claim 1, wherein, in the course of the evaluation of the Doppler frequency spectrum by the electronic evaluation processor, it is determined whether an inflow or an outflow of the fill substance is occurring.

5. The method according to claim 1, wherein, in the evaluation of the echo curve by the electronic evaluation processor, the identification of a structure in the echo curve, which is assigned to the fill level of the fill substance, is affected in dependence of the results of the evaluation of the Doppler frequency spectrum.

6. The method according to claim 1, wherein the echo curve and the Doppler frequency spectrum are recorded at the same time.

7. The method according to claim 1, wherein the echo curve and the Doppler frequency spectrum are recorded with different radar sensors.

8. The method according to claim 1, wherein a flow meter is disposed in an inflow or an outflow, a measured value of which is available to a signal evaluation in the radar sensor as an additional input variable.

9. A fill level measuring device with at least one radar sensor and an electronic control and evaluation processor, wherein the electronic control and evaluation processor is set up for the implementation of a method according to claim 1.

* * * * *